United States Patent [19]
Anderson et al.

[11] Patent Number: 5,713,328
[45] Date of Patent: Feb. 3, 1998

[54] SPARK IGNITED INTERNAL COMBUSTION ENGINE WITH MULTIPLE EVENT FUEL INJECTION

[75] Inventors: Richard Walter Anderson, Ann Arbor; Paul D. Sleeman, South Lyon; Robert Michael Whiteaker; Jialin Yang, both of Canton, all of Mich.

[73] Assignee: Ford Global Technologies, Inc., Dearborn, Mich.

[21] Appl. No.: 829,292

[22] Filed: Mar. 31, 1997

[51] Int. Cl.$^6$ .................................................. F02B 19/02
[52] U.S. Cl. .................................................. 123/299
[58] Field of Search ........................... 123/299, 25 C, 123/446, 297

[56] References Cited

U.S. PATENT DOCUMENTS

| | | | |
|---|---|---|---|
| 5,168,847 | 12/1992 | Grieshaber et al. | 123/299 |
| 5,170,751 | 12/1992 | Tosa et al. | 123/25 C |
| 5,231,962 | 8/1993 | Osuka et al. | 123/299 |
| 5,261,366 | 11/1993 | Regueiro | 123/299 |
| 5,365,902 | 11/1994 | Hsu | 123/299 |
| 5,438,966 | 8/1995 | Teegen | 123/297 |
| 5,482,017 | 1/1996 | Brehob et al. | 123/299 |
| 5,492,098 | 2/1996 | Hafner et al. | 123/446 |

OTHER PUBLICATIONS

"Mixture Formation Process and Combustion Process of Direct Injection S.I. Engine", Matsushita et al, Proceedings of JSAE, No. 965, Oct. 10, 1996.

"Fundamental Study on DISC Engine with Two-Stage Fuel Injection", Hatorri et al, JSME International Journal, Series B, vol. 38, No. 1, 1995.

"A Review of Mixture Preparation and Combustion Control Strategies for Spark-Ignited Direct Injection Gasoline Engines", Zhao et al, SAE Technical Paper 970627.

"Understanding the Thermodynamics of Direct Injection Spark Ignition (DISI) Combustion Systems: An Analytical and Experimental Investigation", Anderson et al, SAE Technical Paper 962018, San Antonio, Texas, Oct. 14–17, 1996.

"Combustion and Emissions in a New Concept DI Stratified Charge Engine with Two-Stage Fuel Injection", Miyamoto et al, SAE Technical Paper 940675.

Primary Examiner—Raymond A. Nelli
Attorney, Agent, or Firm—Jerome R. Drouillard

[57] ABSTRACT

A spark ignited, reciprocating internal combustion engine, including a piston housed within a cylinder closed by a cylinder head has a fuel system for injecting fuel directly into the engine cylinder so as to achieve a homogeneous mixture with the fuel injection system injecting a first fraction of fuel during a first injection event and a second fraction of fuel during a second injection event.

13 Claims, 2 Drawing Sheets

SPARK IGNITED INTERNAL COMBUSTION ENGINE WITH MULTIPLE EVENT FUEL INJECTION

FIELD OF THE INVENTION

The present invention relates to a system and method for providing fuel directly to the cylinders of a spark ignited internal combustion engine.

BACKGROUND INFORMATION

Spark ignited, direct injection, four-stroke cycle internal combustion engines, although known to the art for some time, have not found widespread use. The absence of broad acceptance of spark-ignited, direct injection engines, at least in the automotive industry, has been related to several factors, including problems with lubricity of gasoline as compared with diesel fuel, problems with air utilization leading to particulate emissions, including smoke, and also problems with knock control.

The inventors of the present invention have determined that it is beneficial to operate a direct injection, spark ignition (hereinafter referred to as DISI) engine using multiple event fuel injection. Although split injection has been suggested in the literature ("*A Review of Mixture Preparation and Combustion Control Strategies for Spark-Ignited Direct-Injection Gasoline Engines*", Zhao et al, SAE Technical Paper 970627; "*Mixture Formation Process and Combustion Process of Direct Injection S.I. Engine*", Matsushita et al, Proceedings of JSAE, No. 965, Oct. 10, 1996), earlier work done on what was termed split injection was intended to maintain a stratified charge in the engine cylinder. This desire to maintain stratification teaches away from the applicants' claimed invention. The present inventors have determined that stratification causes the formation of particulate and smoke matter—two exhaust emissions which are currently regulated and likely to be the subject of intense regulation in the future.

The present fuel injection system and method solves problems associated with systems used with conventional DISI engines by injecting the fuel during at least two periods of a four-stroke cycle. The present inventors have determined that it is beneficial to inject a portion of the fuel early during the cycle, i.e., during the induction stroke or intake stroke, so as to increase the volumetric efficiency of the engine by cooling the charge. Moreover, it has been determined that it is further beneficial to inject a portion of the fuel later in the cycle, e.g., at 150 crank angle degrees before top dead center (BTDC). Injecting a portion of the fuel later during the compression stroke advantageously allows the knock limited spark advance of the engine to increase, thereby improving the thermal efficiency of the engine's operation.

SUMMARY OF THE INVENTION

A spark ignited, reciprocating internal combustion engine includes at least one piston housed within a cylinder closed by cylinder head and a fuel system for injecting fuel directly into the engine cylinder so as to achieve a homogeneous mixture, with the fuel injection system injecting a first fraction of the fuel during a first injection event and a second fraction of fuel during a second injection event. The timing of the first and second injection events and the quantities of fuel injected during each of the events are selected so as to cause the resulting air/fuel mixture in the cylinder to be homogeneous. According to the present invention, a DISI engine having the inventive fuel system will burn a homogeneous fuel mixture during full load operation. The magnitudes of the first and second fuel fractions are determined by an engine controller working with measured values of one or more engine operating parameters.

In general, the first fuel fraction is about two-thirds of the fuel, with the second fraction being the remaining one-third of the injected fuel.

The starting points of the first and second injection events are advanced when the engine transitions from an operating point at a lower speed to an operating point at a higher speed, and vice versa. When the engine operates according to a four-stroke cycle, the starting point of the first injection event will generally occur between 30–120 crank angle degrees after top dead center (ATDC) of the intake stroke. The starting point of the second injection event would generally occur between 60–180 crank angle degrees BTDC of the compression stroke. In general, the start of the first injection event is selected such that the majority of the fuel droplets in the fuel spray are vaporized immediately prior to closure of the intake valve(s). In this manner, the effect of charge cooling by fuel evaporation upon volumetric efficiency will be maximized. The start of the second injection event is selected such that a homogeneous mixture will be formed, so as to avoid soot generation and unstable combustion. With this constraint, the second injection event is timed as late as possible to maximize knock suppressing effect of charge cooling. Of course, the timing of both injection events depends upon the speed of the engine and the size of the fuel droplets.

The ratio of the first fuel fraction to the second fuel fraction is selected such that only the minimum quantity of fuel is available during the second injection event to allow the engine to operate at or near MBT spark timing without knock.

DETAILED DESCRIPTION OF THE PREFERRED EMBODIMENTS

Figure 1:
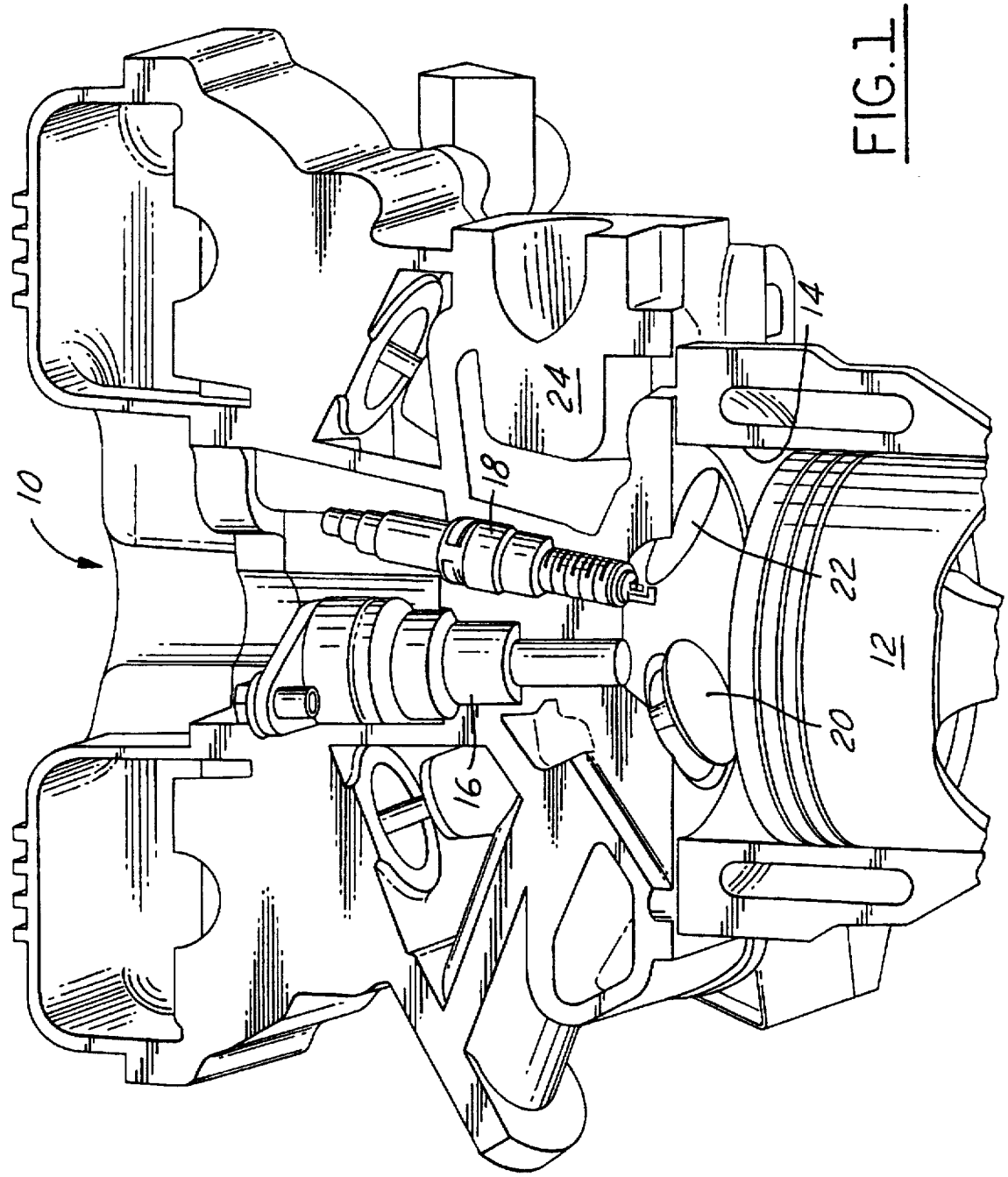
FIG. 1 is a sectional view, partly cut-away, of an engine having a fuel system according to the present invention.
Figure 2:
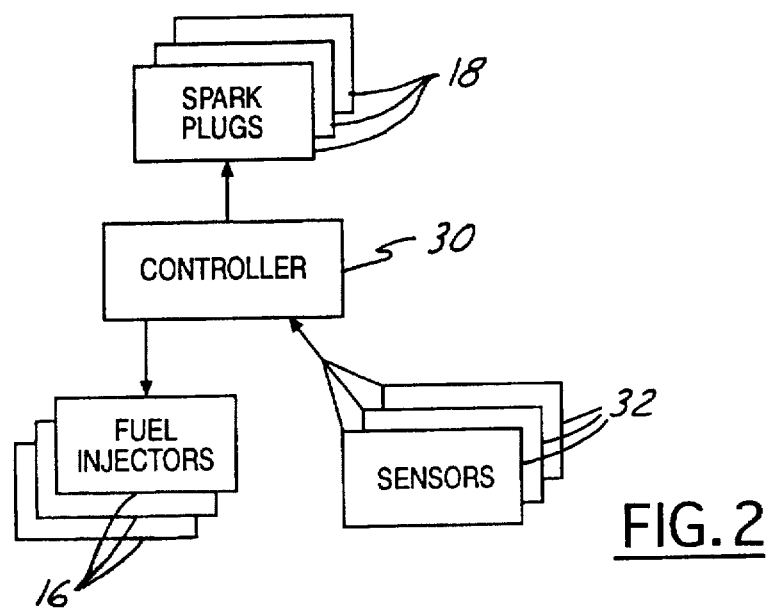
FIG. 2 is a block diagram showing various components of an engine having a fuel injection system according to the present invention.

As shown in FIG. 1, a reciprocating internal combustion engine having piston 12 within cylinder 14, which is closed by cylinder head 24, receives an air charge which passes by intake valve 20; spent gases flow from cylinder 14 past exhaust valve 22. Fuel enters cylinder 14 by means of fuel injector 16, which is operated by controller 30 (FIG. 2). The combustion mixture is ignited conventionally by means of spark plug 18 which is also operated by controller 30. Those skilled in the art will appreciate in view of this disclosure that a system according to the present invention could be employed with single or multi-cylinder two or four stroke cycle engines having one, two, or more intake and/or exhaust valves with the details of such constructions being consigned to those desirous of employing a system according to the present invention.

As shown in FIG. 2, engine controller 30 which is preferably drawn from the class of controllers known to those skilled in the art and used for operation of internal combustion engines, receives data from a plurality of sensors 32. These sensors, which generate output signals in response to various engine operating parameters, measure such engine operating parameters as charge air temperature, fuel pressure, throttle position, engine coolant temperature, engine lubricant temperature, induction system absolute pressure, fuel system pressure, engine speed, engine load, exhaust system temperature, exhaust gas oxygen, and other parameters known to those skilled in the art and suggested by this disclosure.

Controller 30 continually reads the outputs of sensors 32 and determines a total quantity of fuel to be injected during the multiple fuel injections occurring during each four-stroke cylinder event, or, for that matter, during a two-stroke cylinder event when the present invention is applied to a two-stroke cycle engine. Controller 30 also determines the relative fractions of fuel to be injected during each of the multiple injection events, as well as the timing of the multiple injection events. Then, controller 30 powers up fuel injectors 16 according to the predetermined fuel quantity and timing. It is assumed here that quantity of fuel provided to the engine's cylinders by fuel injectors 16 will generally be proportional to the amount of time that the injectors are in an open condition according to conventional pulse width modulated fuel injection strategy as well as being proportional to the square root of the fuel pressure at the injectors. Of course, both of these parameters may be controlled and selected according to the needs of any particular engine to which the present system is applied.

Figure 3:
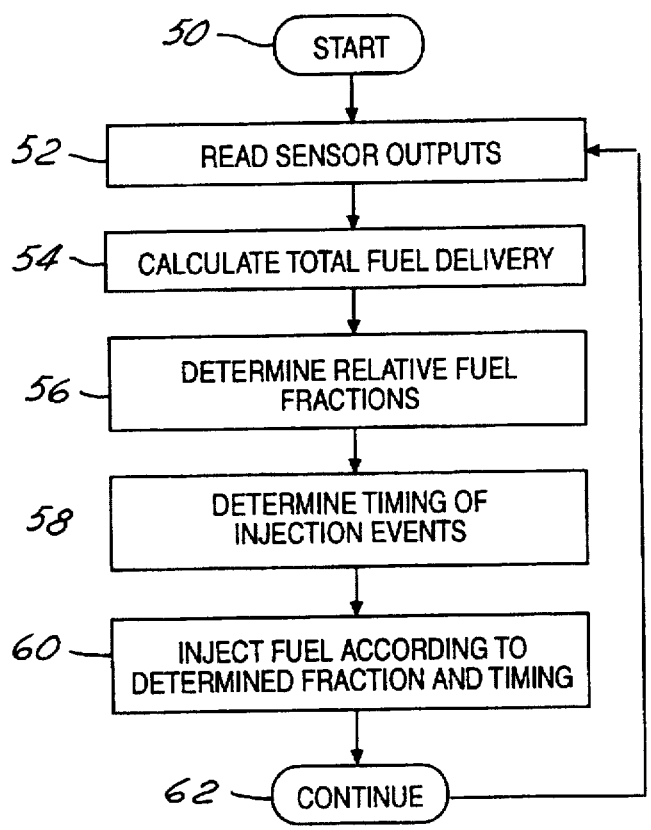
FIG. 3 is a block diagram showing a method of fueling an engine according to the present invention.

FIG. 3 illustrates only one of many potential algorithms for employing a system according to the present invention. The routine begins at box 50 wherein controller 30 is started along a calculational path. At box 52, controller 30 reads the outputs of sensors 32. At box 54, controller 30 calculates total fuel to be delivered during the two or four-stroke cycle, depending on the type of engine to which the present system is applied. Continuing at box 56, controller 32 determines the relative fuel fractions. These fractions are chosen so as to optimize the efficiency of the engine according to trade off alluded to earlier in this specification. Specifically, when a relatively greater quantity of fuel is injected early on in the cycle, volumetric efficiency is improved. But, if too great a fraction of the fuel is injected early in the cycle, late charge cooling, which may be used to suppress spark knock or pre-ignition, will be unavailable. Thus, it has been determined by the inventors of the present invention that a homogeneous charge may be produced where two-thirds of the fuel is injected early on during the cycle with one-third being held back for later injection so as to produce both charge cooling and high volumetric efficiency while at the same time suppressing knock.

The inventors of the present invention have further determined that volumetric efficiency approaching that achieved with a single early injection may be accomplished even if one-third of the fuel is injected later on during the cycle. The chart shown below illustrates typical injection starting point timings for an engine operating at 1500, 3000, and 4000 rpm. In the chart, ATDC means crank angle degrees after top dead center of the intake stroke; BTDC means crank angle degrees before top dead center of the compression stroke.

| 1500 rpm | first injection | 90 ATDC |
| | second injection | 90-120 BTDC |
| 3000 rpm | first injection | 40-50 ATDC |
| | second injection | 120-150 BTDC |
| 4000 rpm | first injection | 30 ATDC |
| | second injection | 150-180 BTDC |

The point of calculating the fractions of fuel to be supplied by each of the multiple injection events as well as the timing of these events is to maximize engine torque. This means that controller 30 is continually recalculating the relative fuel fractions and the timing of the injection events. Timing of the events is determined at block 58 by reference to the engine speed. As those skilled in the art know, sufficient time must be allowed at various engine speeds for the fuel to properly vaporize so as to avoid unnecessary formation of smoke and other particulate matter. At block 60, controller 30 gives the commands to injectors 16 to provide fuel to the engine according to the predetermined fractions, and total amount and injection timing. Then, the routine continues at box 62 with a new reading from box 62 to a new reading of sensor outputs at box 58.

Another function of controller 30 is to calculate spark timing for controlling spark plugs 18. In general, the present inventors have determined that it is desirable to operate a DISI engine at MBT spark timing. In this case, MBT is defined a minimum spark advance for best torque. This MBT timing is determined by controller 30, by means of either a look-up table, or perhaps an algorithm, taking into account many of the sensed operating parameters having values provided by sensors 32. A difference here is that the quantity of fuel, the injection timing and the relative fuel fractions are determined along with MBT spark timing so as to maximize efficiency of the engine. The quantity and timing of the injected fuel may be employed in the determination of MBT timing. Finally, the actual timing selected by controller 30 may not be the anticipated MBT timing, but rather a function of the MBT timing. For example, if controller 30 does a preliminary calculation to determine that MBT timing should be 25 crank angle degrees BTDC, the timing may be set at 20 degrees BTDC to assure that the engine does not knock.

While the invention has been shown and described in its preferred embodiments, it will be clear to those skilled in the arts to which it pertains that many changes and modifications may be made thereto without departing from the scope of the invention.

We claim:

1. A spark ignited, reciprocating internal combustion engine comprising:
    at least one piston housed within a cylinder closed by a cylinder head; and
    a fuel system for injecting fuel directly into the engine cylinder, so as to achieve a homogeneous mixture with said fuel injection system injecting a first fraction of about two-thirds of the fuel during a first injection event and a second fraction of about one-third of the fuel during a second injection event.

2. An engine according to claim 1, wherein the timing of said first and second injection events and the quantities of fuel injected during each of said events are selected to cause the resulting air/fuel mixture in said cylinder to be homogeneous.

3. An engine according to claim 1, wherein said engine burns a homogeneous air/fuel mixture during full load operation.

4. An engine according to claim 1, wherein said first fraction and said second fraction are determined by an engine controller according to measured values of one or more engine operating parameters.

5. An engine according to claim 1, wherein the starting points of said first and second injection events are advanced when the engine transitions from an operating point at a lower speed to an operating point at a higher speed.

6. An engine according to claim 1, wherein the engine operates according to a four stroke cycle, with the starting point of said first injection event between 30 and 120 crank angle degrees after top dead center of the intake stroke.

7. An engine according to claim 1, wherein the engine operates according to a four stroke cycle, with the starting point of said second injection event occurring between 60 and 180 crank angle degrees before top dead center of the compression stroke.

8. An engine according to claim 1, wherein the ratio of said first fuel fraction to said second fuel fraction is selected such that only a minimum quantity of fuel is available during the second injection event to allow the engine to operate at MBT spark timing without knock.

9. A multiple injection fuel system for a spark ignited internal combustion engine, comprising:

at least one fuel injector for injecting fuel directly into an engine cylinder during multiple injection events;

a plurality of sensors for measuring the values of a plurality of engine operating parameters and for generating output signals in response to said measured values;

a controller for operating said injector, for receiving the outputs of said sensors, and for determining:

a total quantity of fuel to be injected by said injector during each cylinder cycle;

the relative fractions of the total quantity of fuel to be injected during each of said multiple injection events; and the timing of each of the multiple injection events.

10. A multiple injection fuel system according to claim 9, wherein said controller further determines MBT spark timing.

11. A multiple injection fuel system according to claim 9, wherein said controller further determines MBT spark timing as a function of at least the relative fractions of the total fuel to be injected during each of the multiple injection events.

12. A method for operating a multiple injection fuel system for a spark ignited internal combustion engine, comprising:

measuring the values of a plurality of engine operating parameters and generating output signals in response to said measured values;

reading the sensor outputs into a controller and determining:

calculating a total quantity of fuel to be injected during multiple fuel injections occurring during each cylinder event;

determining the relative fractions of fuel to be injected during each of said multiple injection events;

determining the timing of each of the multiple injection events; and injecting the calculated total quantity of fuel during multiple injection events according to the determined relative fractions and the determined timing.

13. A method according to claim 12, further comprising the steps of calculating MBT spark timing as a function of at least the quantity and timing of fuel being delivered, and setting the engine's spark timing as a function of the calculated MBT timing.

* * * * *